US012570273B2

(12) United States Patent
Tokuhiro

(10) Patent No.: US 12,570,273 B2
(45) Date of Patent: Mar. 10, 2026

(54) PARKING ASSISTANCE METHOD AND PARKING ASSISTANCE DEVICE

(71) Applicant: Panasonic Intellectual Property Management Co., Ltd., Osaka (JP)

(72) Inventor: Takafumi Tokuhiro, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 141 days.

(21) Appl. No.: 18/421,453

(22) Filed: Jan. 24, 2024

(65) Prior Publication Data

US 2024/0294164 A1     Sep. 5, 2024

(51) Int. Cl.
| | |
|---|---|
| *B60W 30/00* | (2006.01) |
| *B60W 10/184* | (2012.01) |
| *B60W 10/20* | (2006.01) |
| *B60W 30/06* | (2006.01) |
| *B60W 30/182* | (2020.01) |
| *B60W 50/00* | (2006.01) |

(52) U.S. Cl.
CPC .......... *B60W 30/06* (2013.01); *B60W 10/184* (2013.01); *B60W 10/20* (2013.01); *B60W 30/182* (2013.01); *B60W 2050/0005* (2013.01); *B60W 2050/0068* (2013.01)

(58) Field of Classification Search
None
See application file for complete search history.

(56) References Cited

U.S. PATENT DOCUMENTS

| | | | | |
|---|---|---|---|---|
| 12,233,909 | B2 * | 2/2025 | Hiei ................... | B62D 15/0285 |
| 2008/0174452 | A1 * | 7/2008 | Yamamoto ........... | B62D 15/028 |
| | | | | 340/932.2 |
| 2013/0085637 | A1 * | 4/2013 | Grimm .............. | B62D 15/0285 |
| | | | | 701/25 |
| 2018/0194344 | A1 * | 7/2018 | Wang ..................... | G05D 1/027 |
| 2019/0016331 | A1 * | 1/2019 | Carlson ............... | G05D 1/0088 |
| 2019/0071070 | A1 * | 3/2019 | Kato .................. | B62D 15/0285 |
| 2019/0176813 | A1 * | 6/2019 | Yamada .............. | B60W 30/06 |
| 2019/0256144 | A1 * | 8/2019 | Yamada ............. | B62D 15/0285 |
| 2021/0107465 | A1 * | 4/2021 | Hiei ........................ | G08G 1/168 |

FOREIGN PATENT DOCUMENTS

JP            6022447        11/2016

* cited by examiner

*Primary Examiner* — Truc M Do

(74) *Attorney, Agent, or Firm* — Greenblum & Bernstein, P.L.C.

(57) ABSTRACT

A parking assistance method according to an embodiment of the present disclosure includes: storing information related to a teacher path in teacher traveling of moving a vehicle and stopping the vehicle in a first parking mode; receiving an instruction to change the parking mode, the instruction designating a second parking mode different from the first parking mode; and correcting the teacher path based on the second parking mode.

19 Claims, 7 Drawing Sheets

PARKING ASSISTANCE DEVICE ⌐3

| | |
|---|---|
| ⌐301 ACQUISITION MODULE | ⌐306 SELF-POSITION ESTIMATION MODULE |
| ⌐302 RECEPTION MODULE | ⌐307 PATH-FOLLOWING CALCULATION MODULE |
| ⌐303 MAP INFORMATION GENERATION MODULE | ⌐308 PARKING MODE MODIFICATION MODULE |
| ⌐304 TRAVEL PATH DETECTION MODULE | ⌐309 OUTPUT CONTROL MODULE |
| ⌐305 STORAGE UNIT | ⌐310 VEHICLE CONTROL MODULE |

PARKING ASSISTANCE METHOD AND PARKING ASSISTANCE DEVICE

CROSS-REFERENCE TO RELATED APPLICATIONS

This application is based upon and claims the benefit of priority from Japanese Patent Application No. 2023-031625, filed on Mar. 2, 2023, the entire contents of which are incorporated herein by reference.

FIELD

Embodiments described herein relate generally to a parking assistance method and a parking assistance device.

BACKGROUND

There has been known a parking assistance technique of moving a vehicle by automated driving when parking the vehicle. Such parking assistance technique includes a technique of learning a travel path based on teacher traveling performed by a driver and performing parking assistance using a result of the learning. This technique is used, for example, in a case of repeatedly performing parking at a predetermined parking position such as a parking lot of a user's home or work. Conventional technologies are described in Japanese Patent No. 6022447, for example.

However, such parking assistance technique has a problem. That is, even when a parking mode such as a parking position and a parking orientation at the time of teacher traveling is not as desired by the user, for example, a vehicle is obliquely stopped, that is, not stopped along the line of a parking space, the vehicle is parked in an undesirable parking mode every time of using automated driving. On the other hand, it has been a burden on the user to retry the teacher traveling until the vehicle can be stopped in the desired parking mode.

One of aims to be achieved by the present disclosure is to appropriately assist parking of a vehicle in an intended parking mode.

SUMMARY

A parking assistance method according to an embodiment of the present disclosure includes: storing information related to a teacher path, the teacher path being a travel path in teacher traveling of moving a vehicle and stopping the vehicle in a first parking mode; receiving an instruction to change a parking mode, the instruction designating a second parking mode different from the first parking mode; and correcting the teacher path based on the second parking mode.

DETAILED DESCRIPTION

Figure 1:
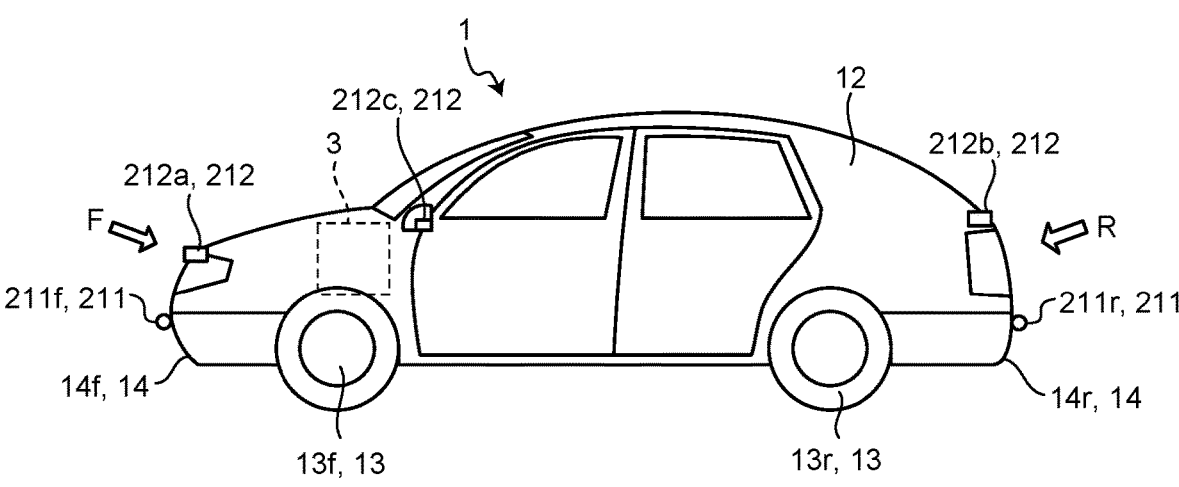
FIG. 1 is a diagram schematically illustrating an example of a vehicle equipped with a parking assistance device according to an embodiment.

Hereinafter, embodiments of a parking assistance device, a vehicle, a parking assistance method, a program, and a recording medium according to the present disclosure will be described with reference to the drawings.

In the description of the present disclosure, components having the same or substantially the same functions as those described above with respect to the already described drawings are denoted by the same reference numerals, and the description thereof may be appropriately omitted. In addition, even in the case of representing the same or substantially the same portion, representation of the dimensions and ratios may be different from each other depending on the drawings. Furthermore, for example, from the viewpoint of ensuring visibility of the drawings, there may be a case, in the description of each drawing, where only main components are denoted by reference numerals, and even components having the same or substantially the same functions as those described above in the previous drawings are not denoted by reference numerals.

In the description of the present disclosure, constituent elements having the same or substantially the same function may be distinguished and described by adding alphanumeric characters to the end of reference numerals. Alternatively, when not distinguishing a plurality of constituent elements having the same or substantially the same function, the constituent elements may be integrally described by omitting alphanumeric characters added to the end of the reference numerals.

FIG. 1 is a diagram schematically illustrating an example of a vehicle 1 equipped with a parking assistance device 3 according to the embodiment. As illustrated in FIG. 1, the vehicle 1 includes a vehicle body 12 and two pairs of wheels 13 disposed in a predetermined direction on the vehicle body 12. The two pairs of wheels 13 include a pair of front tires 13$f$ and a pair of rear tires 13$r$.

Here, the front tire 13$f$ according to the embodiment is an example of a first wheel. The rear tire 13$r$ according to the embodiment is an example of a second wheel. Although FIG. 1 exemplifies the vehicle 1 having four wheels 13, the vehicle 1 is not limited thereto. The vehicle 1 only needs to include at least one front tire 13$f$ and at least one rear tire 13$r$. The wheels 13 of the vehicle 1 may be provided in plurality, that is, the number may be two, three, or five or more.

A direction of at least one wheel (steered wheel) of the wheels 13 of the vehicle 1 electrically or mechanically interlocks with, for example, a rotation angle of a steering wheel disposed in front of a driver's seat 130a, that is, a steering angle. That is, the vehicle 1 can turn right or left by steering. The steered wheel may be the rear tire 13r or both the front tire 13f and the rear tire 13r.

The vehicle body 12 is supported by wheels 13. The vehicle 1 includes a driving machine (not illustrated), and is movable by driving at least one wheel (driving wheel) of the wheels 13 of the vehicle 1 by power of the driving machine. Applicable driving machines include any driving machine such as an engine using gasoline, hydrogen, or the like as a fuel, a motor using electric power from a battery, or a combination of an engine and a motor. In this case, a predetermined direction in which the two pairs of wheels 13 are disposed is the traveling direction of the vehicle 1. The vehicle 1 can move forward or backward by switching gears (not illustrated) or the like.

The vehicle body 12 has a front end F which is an end on the front tire 13f side and a rear end R which is an end on the rear tire 13r side. The vehicle body 12 has a substantially rectangular shape in top view, and four corners of the substantially rectangular shape may be referred to as ends.

There is provided a pair of bumpers 14 near the lower end of the vehicle body 12 at the front and rear ends F and R of the vehicle body 12. A front bumper 14f of the pair of bumpers 14 covers the entire front surface and a part of the side surface in the vicinity of the lower end of the vehicle body 12. A rear bumper 14r of the pair of bumpers 14 covers the entire rear surface and a part of the side surface in the vicinity of the lower end of the vehicle body 12.

Figure 2:
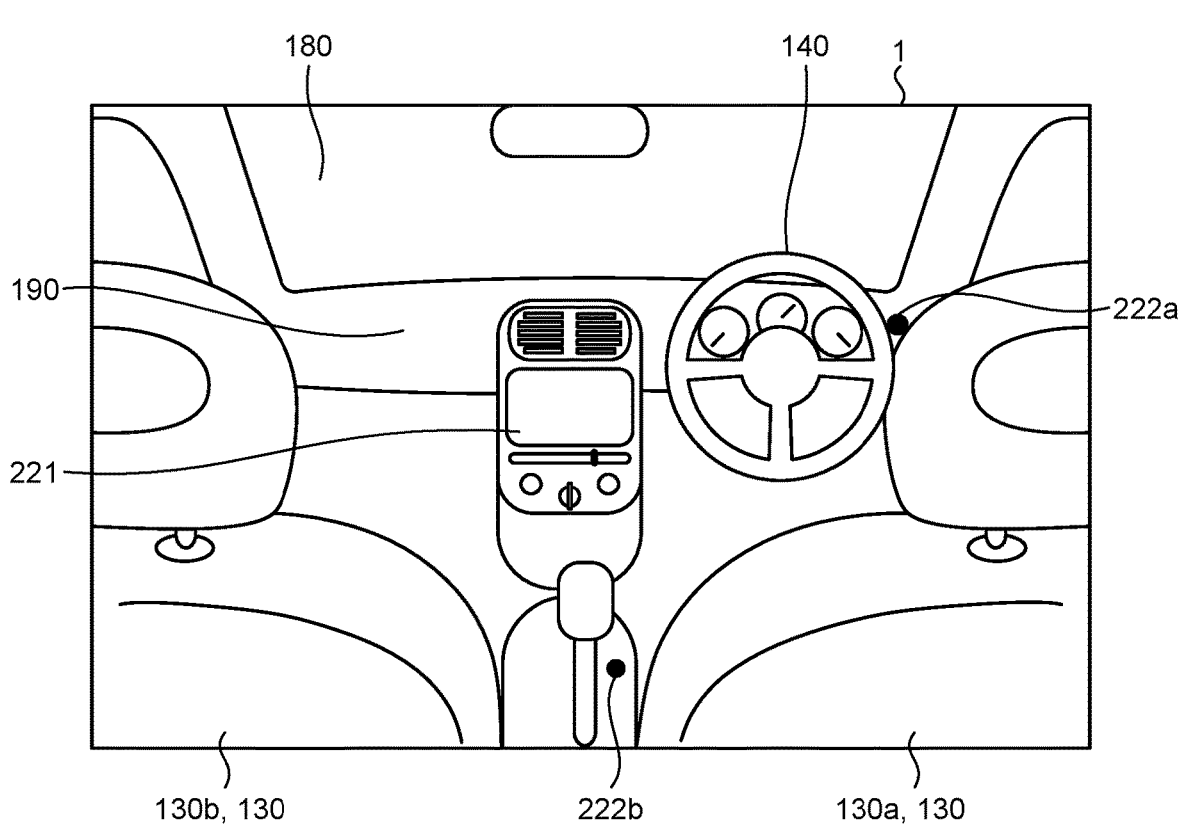
FIG. 2 is a diagram illustrating an example of a configuration in the vicinity of a driver's seat of the vehicle according to the embodiment.

Here, a configuration in the vicinity of the driver's seat of the vehicle 1 of the present embodiment will be described. FIG. 2 is a diagram illustrating an example of a configuration in the vicinity of the driver's seat 130a of the vehicle 1 according to the embodiment.

As exemplified in FIG. 2, the vehicle 1 includes at least one seat 130. FIG. 2 exemplifies a driver's seat 130a and a passenger seat 130b as the seat 130. In addition, in front of the driver's seat 130a, there are provided a steering wheel 140, a windshield 180, a dashboard 190, a display device 221, and operation buttons 222a and 222b.

The steering wheel 140 is provided in front of the driver's seat 130a and can be operated by the driver. The rotation angle of the steering wheel 140, that is, the steering angle, is electrically or mechanically interlocked with a change in the direction of the front tire 13f, which is a steered wheel. The steered wheel may be the rear tire 13r or both the front tire 13f and the rear tire 13r.

As exemplified in FIG. 1, the vehicle 1 is equipped with the parking assistance device 3. The parking assistance device 3 is an information processing device that can be mounted on the vehicle 1, and is implemented by an electronic control unit (ECU) or an on board unit (OBU) provided inside the vehicle 1, for example. Alternatively, the parking assistance device 3 may be an external computer installed near the dashboard 190 of the vehicle 1 or may also serve as another device such as a car navigator.

Figure 3:
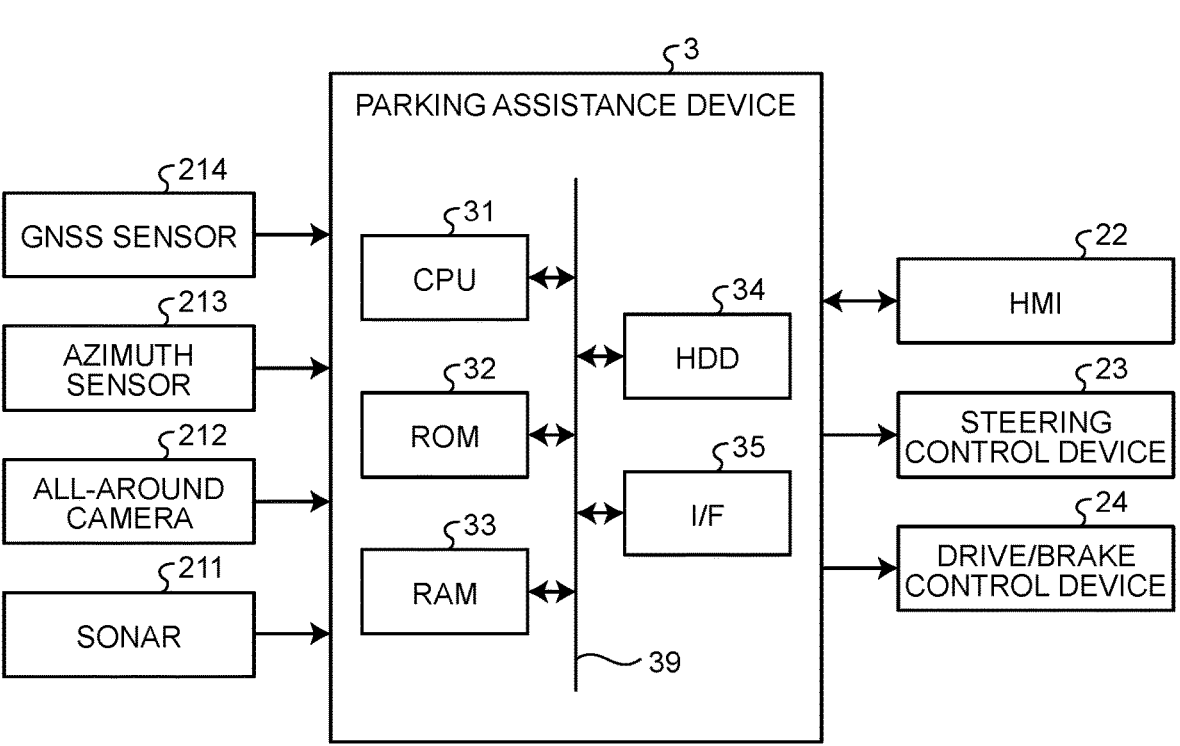
FIG. 3 is a diagram illustrating an example of a hardware configuration of the parking assistance device according to the embodiment.

FIG. 3 is a diagram illustrating an example of a hardware configuration of the parking assistance device 3 according to the embodiment. As illustrated in FIG. 3, the parking assistance device 3 includes a central processing unit (CPU) 31, read only memory (ROM) 32, random access memory (RAN) 33, a hard disk drive (HDD) 34, and an interface (I/F) 35. The CPU 31, the ROM 32, the RAM 33, the HDD 34, and the I/F (interface) 35 are mutually connected by a bus 39 or the like, so as to form a hardware configuration using a normal computer.

The CPU 31 is an arithmetic device that performs overall control of the parking assistance device 3. The CPU 31 loads a program stored in the ROM 32 or the HDD 34 onto the RAM 33 and executes the program, thereby implementing each process described below.

The CPU 31 according to the embodiment is an example of a processor in the parking assistance device 3. As the processor, another type of processor may be provided instead of the CPU 31 or in addition to the CPU 31. Applicable examples of the another type of processor include various processors such as a graphics processing unit (GPU) and a digital signal processor (DSP), or circuits such as a dedicated arithmetic circuit implemented by an application specific integrated circuit (ASIC) and a field programmable gate array (FPGA).

The ROM 32 stores programs, parameters, and the like that implement various types of processing performed by the CPU 31.

The RAM 33 is a main storage device of the parking assistance device 3, for example, and temporarily stores data necessary for various types of processing performed by the CPU 31.

The HDD 34 stores various data, programs, and the like used by the parking assistance device 3. As an example, the HDD 34 stores information obtained from in-vehicle sensors mounted on the vehicle 1, such as a sonar 211, an all-around camera 212, an azimuth sensor 213, and a GNSS sensor 214. Instead of the HDD 34 or in addition to the HDD 34, various storage media and storage devices such as a solid state drive (SSD) and a flash drive can be used as appropriate.

The I/F 35 is an interface for transmitting and receiving data. The I/F 35 receives data from another device provided in the vehicle 1, such as an in-vehicle sensor or an HMI 22 on the vehicle 1, for example. In addition, the I/F 35 transmits data to other devices provided in the vehicle 1, such as the HMI 22, a steering control device 23, and a drive/brake control device 24. In addition, the I/F 35 acquires a signal from an accelerator sensor (not illustrated) that detects a driver's operation amount of an accelerator pedal or a signal from a brake sensor (not illustrated) that detects a driver's operation amount of a brake pedal, or a driver's operation amount based on these signals.

Note that the I/F 35 may transmit and receive information to and from another ECU mounted on the vehicle 1 via an in-vehicle network including a controller area network (CAN) and Ethernet (registered trademark) in the vehicle 1, or may communicate with an information processing device outside the vehicle 1 via a network such as the Internet. For example, the parking assistance device 3 is connected, via the in-vehicle network, to each of the sonar 211, the all-around camera 212, the azimuth sensor 213, the GNSS sensor 214, the HMI 22, the steering control device 23, and the drive/brake control device 24, which are provided in the vehicle 1.

As an example, the I/F 35 may acquire, via an in-vehicle network, information regarding the state of the vehicle 1, such as a vehicle speed pulse, each speed including a yaw rate, acceleration, position information, and gear shift information from another ECU or various in-vehicle sensors of the vehicle 1, for example.

The vehicle 1 is equipped with a plurality of in-vehicle sensors. FIGS. 1 and 3 illustrate the sonar 211 and the all-around camera 212. FIG. 3 further exemplifies the azimuth sensor 213 and the GNSS sensor 214.

The sonar 211 is provided at a predetermined end of the vehicle body 12, for example, and transmits and receives a sound wave such as an ultrasonic wave. The sonar 211 includes wave transmitters/receivers 211*f* and 211*r*. For example, one or more wave transmitters/receivers 211*f* are disposed on the front bumper 14*f*, while one or more wave transmitters/receivers 211*r* are disposed on the rear bumper 14*r*. Furthermore, the number and/or positions of the wave transmitters/receivers 211*f* and 211*r* can be changed as appropriate, not limited to the example illustrated in FIG. 1. For example, the vehicle 1 may include the wave transmitters/receivers 211*f* and 211*r* on the left and right sides.

The sonar 211 detects an obstacle around the vehicle 1 based on the transmission/reception result of the sound wave. In addition, the sonar 211 measures a distance between the vehicle 1 and an obstacle around the vehicle 1 based on the transmission/reception result of the sound wave.

The present embodiment exemplifies the sonar 211 using a sound wave such as an ultrasonic wave, but the device is not limited thereto. For example, the vehicle 1 may include a radar that transmits and receives electromagnetic waves instead of the sonar 211 or in addition to the sonar 211.

The all-around camera 212 is provided in the vehicle 1 so as to be able to image the surroundings of the vehicle 1. As an example, the vehicle 1 includes, as the all-around camera 212, a front camera 212*a* that images the front, a rear camera 212*b* that images the rear, a left side camera 212*c* that images the left side, and a right side camera (not illustrated) that images the right side.

The all-around camera 212 captures an image around the vehicle 1. The all-around camera 212 is, for example, a camera that captures an image based on visible light and/or infrared light. The image captured by the all-around camera 212 may be a moving image or a still image.

Note that the position and/or number of the all-around cameras 212 can be changed as appropriate, not limited to the example illustrated in FIG. 1. For example, vehicle 1 may include only two cameras, namely, the front camera 212*a* and the rear camera 212*b*. Alternatively, the vehicle 1 may further include another camera in addition to the above-described example. For example, a part or all of the all-around cameras 212 may be provided in a vehicle interior space (inside) of the vehicle 1. The all-around camera 212 may be a camera built in the vehicle 1, an on-dash drive recording camera added to the vehicle 1, or the like.

The azimuth sensor 213 detects the azimuth of the traveling direction of the vehicle 1. The azimuth sensor 21 is, for example, a sensor that measures the azimuth of the traveling direction of the vehicle 1 based on a rotation difference between the left and right wheels 13 of the vehicle 1, geomagnetism, a gas rate gyro, an optical fiber gyro, or the like. Note that a known method can be adopted as a method of obtaining the azimuth of the traveling direction of the vehicle 1, with no particular limitation.

The GNSS sensor 214 detects position information indicating the current position of the vehicle 1. As an example, the GNSS sensor 214 is a global navigation satellite system (GNSS) sensor that outputs position information of the vehicle 1, such as a global positioning system (GPS) sensor. The GNSS sensor 214 includes: a GNSS antenna that receives a radio wave (GNSS signal) from a satellite; and a GNSS circuit that obtains position information (GNSS coordinates) based on radio waves received by the GNSS antenna from at least two satellites.

Note that the vehicle 1 may include other types of in-vehicle sensors (not illustrated). As an example, the vehicle 1 may include a steering angle sensor that outputs a signal corresponding to a driver's operation amount of the steering wheel 140, that is, a steering angle. As an example, the vehicle 1 may include a wheel speed sensor that outputs a signal corresponding to the rotation speed and the rotation direction of the wheels 13. As an example, the vehicle 1 may include a brake sensor that detects a driver's operation amount of a brake pedal. As an example, the vehicle 1 may include an accelerator sensor that detects a driver's operation amount of an accelerator pedal. As an example, the vehicle 1 may include an acceleration sensor that outputs a signal corresponding to acceleration applied to the vehicle 1. As an example, the vehicle 1 may include a gyro sensor that outputs a signal corresponding to an angular velocity applied to the vehicle 1.

The HMI 22 is an interface for outputting various types of information such as a notification and a warning to the driver of the vehicle 1. The HMI 22 is an interface for receiving input of various types of information performed by the driver of the vehicle 1. The HMI only needs to be able to output a notification or a warning so as to be recognizable by the driver of the vehicle 1 and receive various operations of the driver of the vehicle 1. Therefore, while the HMI 22 is provided around the driver's seat of the vehicle 1, the HMI 22 may be provided in another portion around the driver's seat such as a rear seat.

The HMI 22 includes a display device that outputs various types of information such as a notification and a warning to the driver of the vehicle 1. As an example, the HMI 22 includes a display device 221, which is provided on a dashboard 190 or a console of the vehicle 1 and configured to be able to output an image. FIG. 2 exemplifies the display device 221 disposed in the center of the dashboard 190. The display device 221 is, for example, a liquid crystal display (LCD) or an organic electro luminescence (EL) display.

Here, the HMI 22 as the display device according to the embodiment is an example of a display unit. The HMI 22 as a display unit displays various screens based on various display information from an output control module 309 described below.

Note that the display device 221 may be configured as a touch panel display. In addition, the display device 221 may be a part of a car navigator mounted on the vehicle 1. Furthermore, the display may be a projection-type display device such as a Head Up Display (HUD) that projects an image (virtual image) in front of the driver, for example, in a display area provided on a windshield or a dashboard (console).

Note that the HMI 22 is not limited to the display device, and may include another output device such as a speaker configured to be capable of outputting a notification sound, a warning sound, or a voice.

In addition, the HMI 22 includes an input device that receives an input of various types of information by the driver of the vehicle 1. As an example, the HMI 22 includes, as an input device, a touch panel of the display device 221 configured as a touch panel display. As an example, the HMI 22 includes operation buttons 222*a* and 222*b* as input devices. FIG. 2 exemplifies: the operation button 222*a* disposed on an instrument panel; and the operation button 222*b* provided on the console. The operation buttons 222*a* and 222*b* may be provided at other positions such as the steering wheel 140 and the dashboard 190. In addition, in a case where there is another input device such as a case where a touch panel of the display device 221 is available as an input device of the HMI 22, the operation buttons 222*a* and 222*b* need not be provided.

Here, the HMI 22 as the input device according to the embodiment is an example of an operation unit. The HMI 22 as an operation unit outputs a signal corresponding to various operations from the user to a reception module 302 to be described below in response to various operations on the touch panel of the display device 221 and the operation buttons 222a and 222b from the user.

Note that the HMI 22 may include other input devices such as other buttons, dials, switches, and microphones. These input devices are disposed on a component of the vehicle 1, such as the dashboard 190, the instrument panel, the steering wheel 140, and the console, for example.

An output device, an input device, or an input/output device of the HMI 22 may be implemented by using an operation terminal capable of receiving, transmitting, or exchanging a signal with the vehicle 1 from the outside of the vehicle 1, such as a tablet terminal, a smartphone, a remote controller, or an electronic key.

The steering control device 23 controls steering of the vehicle 1. The steering control device 23 controls the direction of the wheels 13 so as to be in a direction corresponding to, for example, a control signal corresponding to a driver's operation amount of the steering wheel 140 or a control signal from the parking assistance device 3. The steering control device 23 may include a steering actuator (not illustrated) that changes the rotation angle of the steering wheel 140 in accordance with the control signal from the parking assistance device 3.

The drive/brake control device 24 controls acceleration/ deceleration of the vehicle 1. The drive/brake control device 24 includes a brake actuator (not illustrated) and an engine controller (not illustrated), for example. The brake actuator operates a brake, changes a gear shift (gear ratio), or controls output of a driving machine such as an engine or a motor based on a detection result of a brake sensor (not illustrated) that detects a driver's operation amount of a brake pedal or a control signal from the parking assistance device 3, thereby applying a brake to the vehicle 1 or decelerating the vehicle 1. The engine controller controls an output of a driving machine such as an engine or a motor based on a detection result of an accelerator sensor (not illustrated) that detects a driver's operation amount of an accelerator pedal or a control signal from the parking assistance device 3, thereby accelerating the vehicle 1.

Note that FIG. 3 exemplifies a case where the sonar 211, the all-around camera 212, the azimuth sensor 213, the GNSS sensor 214, the HMI 22, the steering control device 23, the drive/brake control device 24 are not included in the parking assistance device 3, but the configuration is not limited thereto. Some or all of them may be included in the parking assistance device 3.

Figure 4:
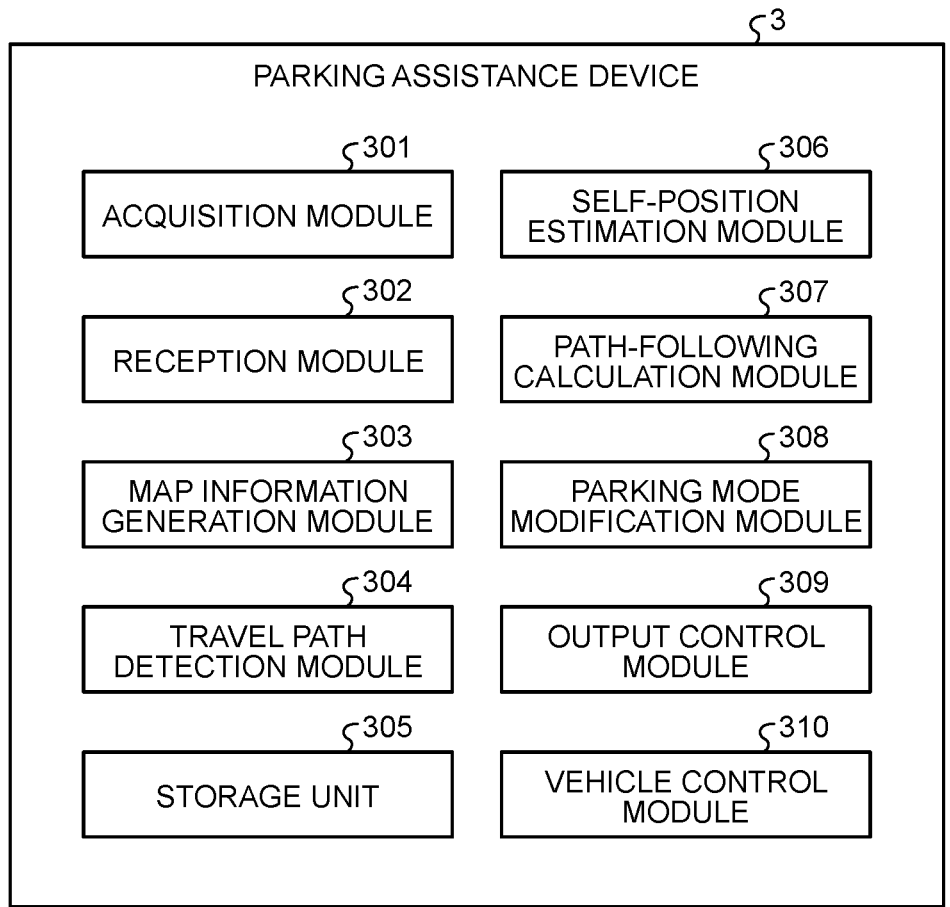
FIG. 4 is a diagram illustrating an example of a functional configuration of the parking assistance device according to the embodiment.

FIG. 4 is a diagram illustrating an example of a functional configuration of the parking assistance device 3 according to the embodiment. The parking assistance device 3 executes the program loaded onto the RAM 33 by the CPU 31 to implement functions as an acquisition module 301, a reception module 302, a map information generation module 303, a travel path detection module 304, a storage unit 305, a self-position estimation module 306, a path-following calculation module 307, a parking mode modification module 308, an output control module 309, and a vehicle control module 310.

Here, each of the acquisition module 301 and the reception module 302 according to the embodiment is an example of a reception module. Each of the acquisition module 301, the map information generation module 303, and the travel path detection module 304 according to the embodiment is an example of a learning unit. Further, each of the self-position estimation module 306, the path-following calculation module 307, and the vehicle control module 310 according to the embodiment is an example of a vehicle control module. In addition, the parking mode modification module 308 according to the embodiment is an example of a correction module. Furthermore, the output control module 309 according to the embodiment is an example of a display control module.

The acquisition module 301 acquires data from other devices provided in the vehicle 1, for example, in-vehicle sensors such as the sonar 211, the all-around camera 212, the azimuth sensor 213, and the GNSS sensor 214, via the I/F 35, for example.

As an example, the acquisition module 301 acquires an output from an external sensor that detects spatial information around the vehicle 1, such as the sonar 211 and the all-around camera 212.

As an example, the acquisition module 301 acquires an output from the in-vehicle sensors that detect a distance, a speed, and azimuth of movement of the vehicle 1, such as the azimuth sensor 213 and the GNSS sensor 214.

The reception module 302 receives various operations from the user based on outputs of the HMI 22 such as the display device 221 and the operation buttons 222a and 222b in response to various operations from the user.

As an example, when the operation button 222a is pressed while the vehicle 1 is stopped, the reception module 302 receives the operation as an assistance function call instruction for requesting a call of the parking assistance function, which is to be a menu display on the display such as a display device 120. The operation may be received as the parking assistance function call instruction when pressing of the operation button 222b or a touch operation on an icon on a touch panel of the display device 221 configured as a touch panel display is performed, instead of the pressing of the operation button 222a.

As an example, when a touch operation on an operation icon on the display screen of the assistance information or pressing of the operation buttons 222a and 222b is performed after the reception of the parking assistance function call instruction, the reception module 302 receives the instruction as a teacher traveling start instruction, a path correction start instruction, a parking mode change instruction, or a reproduced traveling start instruction, according to the operation.

For example, the reception module 302 receives a parking mode change instruction that designates a parking mode 601b (refer to FIG. 7) different from a parking mode 601a (refer to FIG. 7) of the teacher path, based on the output of the HMI 22 in response to a user's operation.

In the present disclosure, the parking assistance function includes a teacher traveling function of acquiring a teacher path by teacher traveling, a path correction function of correcting the teacher path, and a reproduced traveling function of moving the vehicle 1 along the teacher path. The teacher traveling function is implemented by a teacher traveling process executed in response to a teacher traveling start instruction. The path correction function is implemented by a path correction process executed in response to an instruction to end the teacher traveling or start the path correction. In the path correction process, when the user's instruction to change the parking mode is received, the teacher path is corrected in accordance with the parking mode designated by the user. The reproduced traveling function is implemented by a reproduced traveling process executed in response to a reproduced traveling start instruction.

In the present disclosure, the teacher traveling is performed as manual traveling or automated traveling by the driver to move the vehicle 1 from a parking start position to a parking end position to park the vehicle 1 in a desired parking mode. In addition, the parking mode is at least one of a parking position and parking orientation (azimuth) of the vehicle 1. The teacher path is a travel path of the vehicle 1 detected in the teacher traveling, that is, a travel trajectory of the vehicle 1 in the model travel. That is, the teacher path includes information indicating the parking mode. The reproduced traveling is automated traveling that causes the vehicle 1 to move along the teacher path.

The map information generation module 303 acquires, during the teacher traveling, a surrounding environment map that defines an environment around the vehicle 1, that is, a surrounding environment that is a space expanding along the travel path of the vehicle 1, as a map. For example, the map information generation module 303 extracts feature points from each of the front, rear, left, and right captured images of the vehicle 1, that is, the surrounding image. By defining the surrounding environment of the vehicle 1 based on the extracted feature points, the map information generation module 303 acquires the surrounding environment map. Here, the surrounding environment map is an example of information related to the travel path. The surrounding environment map is information about a surrounding environment that is a space expanding along the travel path, and is an example of spatial information.

The method of extracting feature points is not particularly limited, and a known method may be applied. For example, the map information generation module 303 extracts feature points from the surrounding image by a method such as Features from Accelerated Segment Test (FAST) or Oriented FAST and Rotated BRIEF (ORB). Further, the map information generation module 303 may preferentially record a feature point satisfying a prescribed condition among feature points extracted from the surrounding image. For example, among a plurality of surrounding images continuous in time series, it is allowable to preferentially select, as a feature point, a feature point extracted from a surrounding image including a longer traveling distance of the vehicle 1 during imaging.

For example, the map information generation module 303 utilizes simultaneous localization and mapping (SLAM) technology for the extracted feature points to detect coordinates indicating the position of each feature point and create a surrounding environment map (local map).

When the position coordinates of each feature point are detected, the position of the vehicle 1 is detected in parallel. In this, the position of the vehicle 1 may be detected by combining the SLAM technique and a dead reckoning (DR) technique with each other. In addition, the position, speed, and moving direction of the vehicle 1 may be calculated using an intelligent transport system (ITS).

Note that the surrounding environment map may be defined by spatial information based on the output of the sonar 211 in addition to spatial information based on a captured image.

In the teacher traveling, the travel path detection module 304 detects the teacher path of the vehicle 1, that is, the travel path in the teacher traveling based on the self-position estimation result detected by the SLAM technique and the dead reckoning technique, for example. In detection of the travel path, the travel path is represented by a set of points (waypoints) existing at substantially the same interval in distance, and each point is detected as path point cloud data holding coordinates indicating a position, azimuth indicating a direction of the vehicle 1 at the position, and a travel speed, as parameters. The detected teacher path is stored in the storage unit 305.

As an example, the travel path detection module 304 detects the teacher path of the vehicle 1 based on the outputs of the azimuth sensor 213 and the GNSS sensor 214 acquired by the acquisition module 301. As an example, the travel path detection module 304 detects the teacher path of the vehicle 1 based on the rotation direction and the rotation speed of each wheel 13 acquired by the acquisition module 301. Note that the speed and the moving direction of the vehicle 1 may be acquired using a vehicle speed pulse or gear shift information transmitted through an in-vehicle network such as CAN.

The storage unit 305 includes ROM 32, RAM 33, or an HDD 34, for example. The storage unit 305 stores the surrounding environment map generated by the map information generation module 303 and the teacher path detected by the travel path detection module 304. In other words, the storage unit 305 stores information related to the teacher path, which is a travel path in teacher traveling that has caused the vehicle 1 to move and stop in the parking mode 601*a* (refer to FIG. 7). In addition, when the path correction has been performed by the parking mode modification module, the storage unit 305 stores the corrected teacher path. In addition, the storage unit 305 stores a constraint condition related to a change amount of a vehicle mode between predetermined adjacent waypoints. The constraint condition is a condition that defines a difference between correctable positions (coordinates) between adjacent waypoints and a difference between correctable angles (yaw angles) between adjacent waypoints. In addition, the storage unit 305 stores correspondence information indicating a correspondence between the number of waypoints calculated as the number requiring correction and the number of waypoints to be correction targets by optimization processing. The correspondence information may be information indicating a constant to be added to the calculated number of waypoints, or may be information indicating a coefficient to be multiplied by the calculated number of waypoints. In addition, a plurality of values of these constants and coefficients may be defined according to the value or category of the calculated number of waypoints.

The self-position estimation module 306 estimates the position and direction of the vehicle 1 when the vehicle 1 performs the reproduced traveling based on the teacher path by the vehicle control module 310 to be described below. As an example, the self-position estimation module 306 reads the feature point information of the surrounding environment map stored in the storage unit 305, and compares the read feature point information with the feature point extracted from the current surrounding image acquired in the reproduced traveling, thereby estimating the position and direction of the vehicle 1.

The position and direction of the vehicle 1 estimated by the self-position estimation module 306 may preferably be a relative position and a relative direction with respect to a reference position and a reference direction such as a start position and a start direction in the acquired travel path. However, it is also allowable to use an absolute position and an absolute direction based on outputs of the azimuth sensor 213 and the GNSS sensor 214.

In each of the teacher traveling and the reproduced traveling, the position of the vehicle 1 is not limited to the position acquired using the dead reckoning technology based on the movement amount of the vehicle 1 from the reference position, and may be the position acquired using known map matching or the GNSS sensor 214.

In the reproduced traveling, the path-following calculation module 307 calculates a merging path, which is a travel path from the current position of the vehicle 1 to be merged into the teacher path, based on the teacher path stored in the storage unit 305 and the position of the vehicle 1 estimated by the self-position estimation module 306. The calculated merging path is stored in the storage unit 305.

The parking mode modification module 308 corrects the teacher path based on the designation of the parking mode by the user. The correction of the teacher path based on the designation of the parking mode will be described below. The corrected teacher path is stored by the storage unit 305.

The output control module 309 generates assistance information regarding a parking mode. In addition, the output control module 309 presents the generated assistance information to the user by the HMI 22. Specifically, the output control module 309 outputs information for displaying the assistance information regarding the parking mode by the HMI 22 to the HMI 22 as the assistance information. The presentation of the assistance information by the HMI 22 will be described below (refer to FIGS. 5 and 8).

The vehicle control module 310 controls reproduced traveling, which causes the vehicle 1 to move along the teacher path and stop in a predetermined parking mode based on the information regarding the teacher path. Specifically, the vehicle control module 310 controls steering, braking, and acceleration/deceleration of the vehicle 1 for following the teacher path. As an example, based on the merging path and the teacher path stored by the storage unit 305 and the position and the direction of the vehicle 1 estimated by the self-position estimation module 306, the vehicle control module 310 detects a difference between the merging path/teacher path and the position and direction of the vehicle 1, and controls at least one of the control amounts of steering, braking, and acceleration/deceleration of the vehicle 1 so as to reduce the detected difference, thereby causing the vehicle 1 to follow the merging path and the teacher path so as to control the reproduced traveling.

Figure 5:
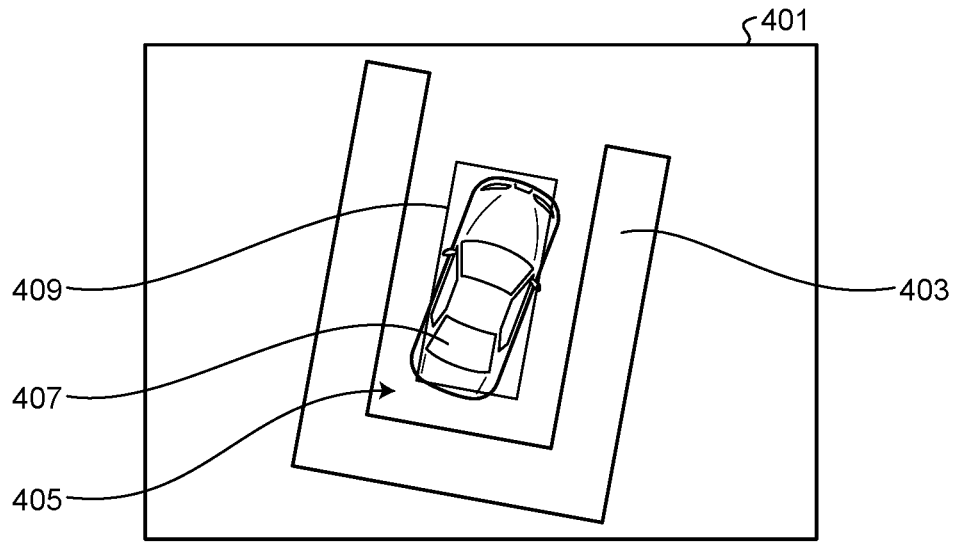
FIG. 5 is a diagram illustrating an example of a display screen displayed in an assistance process according to the embodiment.

Here, the presentation of the assistance information by the HMI 22 will be described. FIG. 5 is a diagram illustrating an example of a display screen 401 displayed in the parking assistance process according to the embodiment. FIG. 5 exemplifies display of assistance information regarding a parking space 405 defined by a wall 403.

The display screen 401 includes a display 407 of the parking mode before correction.

As an example, the display screen 401 is displayed when the teacher traveling is finished. The display 407 on the display screen 401 may be a surround view image indicating the current parking mode. For example, the output control module 309 recognizes the end of the teacher traveling when a user's operation instructing the end of the model travel is received by the reception module 302 or when the stopping time of the vehicle 1 exceeds a predetermined threshold in the teacher traveling.

Here, the surround view image is an overhead view image of the vehicle 1 generated by combining images of a surrounding image (for example, front, rear, left, and right images) of the vehicle 1 obtained by the all-around camera 212.

As an example, the display screen 401 is displayed when a user's operation instructing to start path correction has been received by the reception module 302. A display 407 on the display screen 401 may be a surround view image indicating the parking mode at an end point of the teacher traveling, which is acquired at the end point of the teacher traveling and stored in the storage unit 305.

Note that the teacher path may have already been corrected in accordance with the designation of the parking mode. In this case, the display 407 on the display screen 401 may be a surround view image stored by the storage unit 305 and indicating the parking mode designated in the latest path correction, that is, the parking mode of the latest teacher path. Note that the surround view image may be an image in which the parking mode of the latest teacher path is superimposed on the surround view image before correction, similarly to a display 409 for designating the parking mode to be described below. Alternatively, when the reproduced traveling based on the latest teacher path has already been performed, the surround view image may be a surround view image acquired at the end point of the reproduced traveling and stored by the storage unit 305.

The display screen 401 further includes the display 409 for designating the parking mode.

As an example, the display 409 on the display screen 401 is a display that simulates a parking mode after the correction. FIG. 5 exemplifies a case where the corrected position and orientation of the vehicle 1 are expressed in a simulated manner by the display of the frame.

In this manner, the output control module 309 according to the embodiment outputs, to the HMI 22, display information for displaying the display screen 401, which is a display screen for designating the parking mode desired by the user and includes the display 407 indicating the parking mode of the teacher path and the display 409 simulating the desired parking mode as an operation target.

The display 409 may include display of input elements such as a slider, a dial, and a numerical value input field for instructing each of the corrected position and orientation of the vehicle 1. That is, the designation of the parking mode may be performed by moving or rotating a display simulating the corrected parking mode such as a frame on the touch panel, or may be performed by an operation on the display of the input element displayed on the touch panel.

Note that each of the displays 407 and 409 is not limited to the example of FIG. 5, and may be a display of a CG image or an icon of the host vehicle, or may be a display of a frame. In addition, the color, line type, and transparency of the display may be different between the displays 407 and 409. With such a change in the display mode, it is possible to suppress difficulty in viewing the display content, leading to facilitation of designation of the parking mode in such a way that the user can easily grasp which display should be operated to designate the ideal parking mode.

As an example, the output control module 309 may use a CG image of the host vehicle to display the parking mode before the correction and may output assistance information for displaying the parking mode after the correction in a simulated manner using a frame. As an example, the output control module 309 may output assistance information for displaying the simulated display of the parking mode after the correction in a color different from the parking mode before the correction. As an example, the output control module 309 may output assistance information for displaying the parking mode before the correction in a translucent tone and performing the simulated display of the parking mode after the correction in an opaque tone.

Here, correction of the teacher path based on the designation of the parking mode will be described. Each of FIGS. 6 and 7 is diagram illustrating path correction according to designation of a parking mode according to the embodiment.

Figure 6:
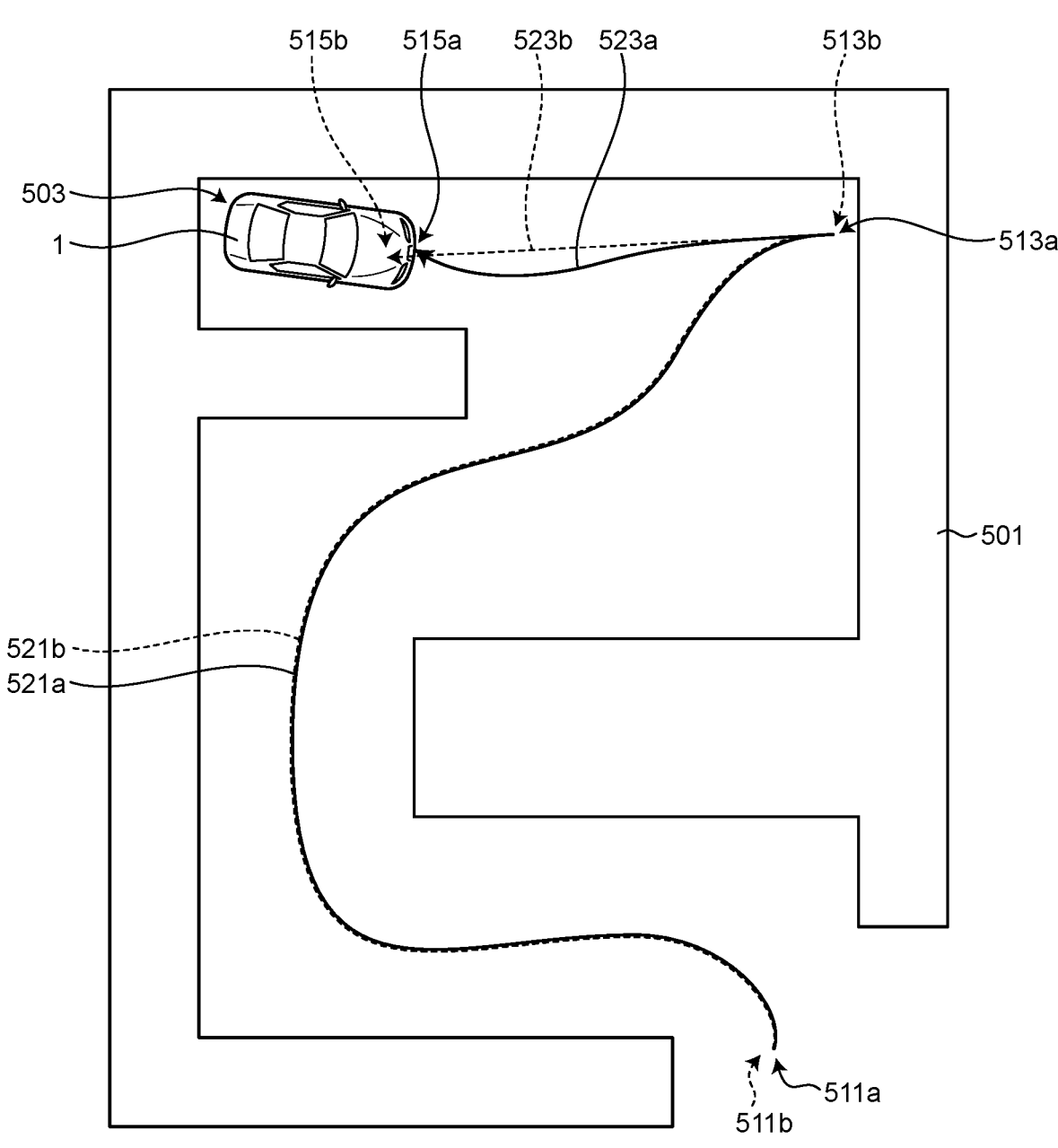
FIG. 6 is a diagram for describing path correction according to designation of a parking mode according to the embodiment.

FIG. 6 relates to parking assistance for parking the vehicle 1 in a parking space 503 defined by a wall 501. In relation to the teacher path before correction, FIG. 6 exemplifies, in solid lines, a parking start position 511a, a forward driving portion 521a, a redirection position 513a, a backward driving portion 523a, and a parking end position 515a. In addition, in relation to the teacher path after correction according to the designation of the parking mode, FIG. 6 exemplifies, in broken lines, a parking start position 511b, a forward driving portion 521b, a redirection position 513b, a backward driving portion 523b, and a parking end position 515b.

Figure 7:
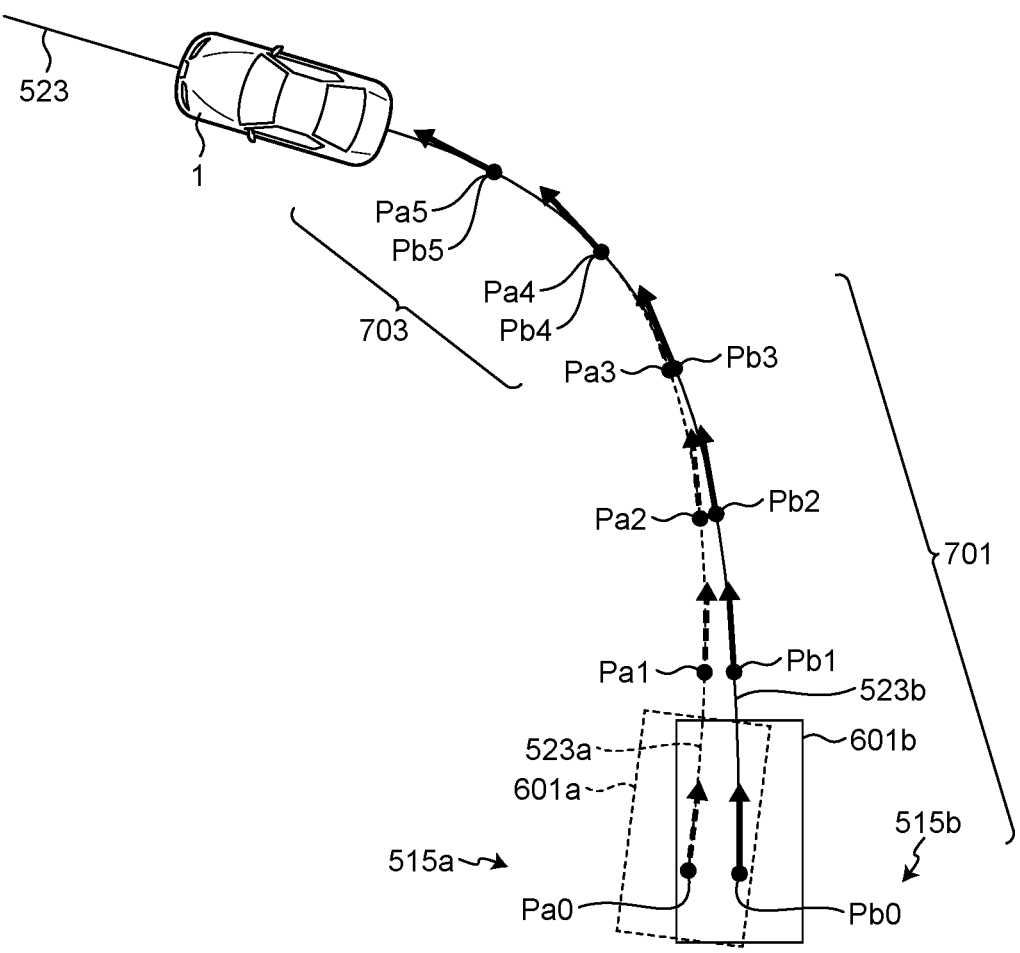
FIG. 7 is a diagram illustrating path correction according to designation of a parking mode according to the embodiment.

FIG. 7 relates to the teacher path before correction (broken line in FIG. 7) and exemplifies some waypoints Pa0, Pa1, Pa2, Pa3, Pa4, and Pa5 among a plurality of waypoints defining the backward driving portion 523a. The waypoint Pa0 corresponds to the parking end position 515a in the teacher path before correction, and expresses the parking mode 601a. Here, in relation to the teacher path detected in the teacher traveling, the waypoint Pa0 according to the embodiment is an example of a first waypoint. The parking mode 601a according to the embodiment is an example of a first parking mode. Note that, regarding a case where the parking mode is further designated for the teacher path subjected to the path correction, the waypoint Pa0 and the parking mode 601a are examples of a second waypoint and a second parking mode, respectively. In addition, FIG. 7 relates to the teacher path (solid line in FIG. 7) corrected according to the designation of the parking mode and exemplifies some waypoints Pb0, Pb1, Pb2, Pb3, Pb4, and Pb5 among a plurality of waypoints defining the backward driving portion 523b. The waypoint Pb0 corresponds to the parking end position 515b in the corrected teacher path, and expresses the parking mode 601b designated by the user. Here, in relation to the teacher path detected in the teacher traveling, the waypoint Pb0 according to the embodiment is an example of the second waypoint. In addition, the parking mode 601b according to the embodiment is an example of the second parking mode. Note that, regarding a case where the parking mode is further designated for the teacher path subjected to the path correction, the waypoint Pb0 and the parking mode 601b are examples of a fourth waypoint and a third parking mode, respectively.

Here, mainly in relation to a teacher path detected by teacher traveling, the following exemplifies a case of performing an instruction to change a parking mode based on a user's operation of designating a desired parking mode. Specifically, the case described is an exemplary case where the parking mode 601b is designated by moving and rotating the display 409 by the user on the display screen 401 of FIG. 5 including the display 407 indicating the parking mode 601a. In addition, here will be an exemplary case where some of the plurality of waypoints defining the backward driving portion 523a of the teacher path are specified as waypoints 701 being correction targets.

The reception module 302 receives the designation of the parking mode 601b, that is, the instruction to change the parking mode based on the output of the HMI 22 according to the user's operation. The position (defined by coordinates) on the local map is uniquely determined by user's designation of the ideal parking mode after the teacher traveling.

In general, it is assumed that user's teacher traveling reflects the user's ideal traveling considering locations through which the user does not want to pass in the environment. Therefore, the parking mode modification module 308 corrects the teacher path together with the parking mode.

When the corrected teacher path includes a sudden orientation change, it would be difficult for the vehicle 1 to follow the teacher path during automated parking. Therefore, the parking mode modification module 308 gradually, that is, gently corrects the teacher path until the teacher path reaches the parking mode 601b so that the parking end position 515b of the corrected teacher path achieves the parking mode 601b designated by the user.

Specifically, the parking mode modification module 308 corrects the teacher path within a range in which the position and orientation of the vehicle 1 between the adjacent waypoints, that is, the change amount of the vehicle mode satisfies a predefined constraint condition.

For example, based on a difference between the positions and the orientation of the parking modes 601a and 601b, that is, the correction amount of the parking mode which is the difference between the waypoints Pa0 and Pb0, and based on the constraint condition defined in advance, the parking mode modification module 308 calculates the number of waypoints required for the correction amount of the parking mode within a range satisfying the constraint condition, that is, calculates the number of waypoints requiring correction.

In addition, for example, the parking mode modification module 308 may specify waypoints corresponding to the number of waypoints calculated from the parking end position 515a, as the waypoints being correction targets. That is, the parking mode modification module 308 may specify, as the waypoints 701 being correction targets, the waypoints corresponding to the number of waypoints requiring correction starting from the waypoint Pa0 among the plurality of waypoints defining the teacher path.

In this case, in accordance with the result of calculation indicating that the correction is to be necessary on four waypoints with reference to the example of FIG. 7, the waypoints 701 being correction targets will be the waypoints Pa0, Pa1, Pa2, and Pa3. Here, in relation to the teacher path detected in the teacher traveling, the waypoint Pa3 according to the embodiment is an example of a third waypoint. Note that, in relation to a case where the parking mode is further designated for the teacher path that has undergone path correction, the waypoint Pa3 is an example of a fifth waypoint. On the other hand, the waypoints Pa4 and Pa5 are waypoints 703 as non-correction targets, which need no correction. The waypoints 703 as non-correction targets are handled as a fixed restricting condition in subsequent optimization processing.

In addition, for example, the parking mode modification module 308 executes optimization processing on the waypoints 701 being correction targets so as to achieve the parking mode 601b designated by the user at the parking end position 515b of the corrected teacher path, thereby obtaining the waypoints Pb0, Pb1, Pb2, and Pb3. Examples of applicable optimization processing include Pose Graph Optimization (PGO) that optimizes only the trajectory by performing orientation adjustment based on an orientation graph, although other known optimization methods may be appropriately used.

Furthermore, for example, the parking mode modification module 308 uses the original waypoints as they are for the waypoints 703 being non-correction targets. That is, the parking mode modification module 308 uses the waypoints Pa4 and Pa5 for the waypoints Pb4 and Pb5. Consequently, in correcting the teacher path, the parking mode modification module 308 defines the teacher path by using a plurality of waypoints including the waypoints 701 being correction targets from the waypoint Pb0 to the waypoint Pb3 and the waypoints 703 being non-correction targets.

In the correction of the teacher path, the parking mode modification module 308 may adjust the distance from the waypoint at which the correction is started, that is, the distance from the parking end position 515*a* as the correction start position, in accordance with the correction amount of the parking mode.

For example, the parking mode modification module 308 may specify the waypoints 701 being correction targets by the number of waypoints obtained by adding certain number of waypoints according to the correspondence information to the number of waypoints that need correction, calculated based on the correction amount of the parking mode and the constraint condition defined in advance. That is, the parking mode modification module 308 may specify, as the waypoints 701 being correction targets, the waypoints corresponding to the number of waypoints needing correction, equal to or greater than the number of waypoints starting from the waypoint Pa0, among the plurality of waypoints defining the teacher path.

In this case, referring to the example of FIG. 7, for example, when calculated that the correction is necessary on three waypoints, the four waypoints Pa0, Pa1, Pa2, and Pa3 are specified as the waypoints 701 being correction targets according to the correspondence information. Note that, although it has been described here that the number of waypoints to be added is one point for simplicity of description, the number of points is not limited thereto. The number of points to be added may be a plurality of points of two or more points. As an example, the number of waypoints may be appropriately determined, for example, as adding the waypoints of 10 points to the waypoints disposed at intervals of 20 cm.

Figure 8:
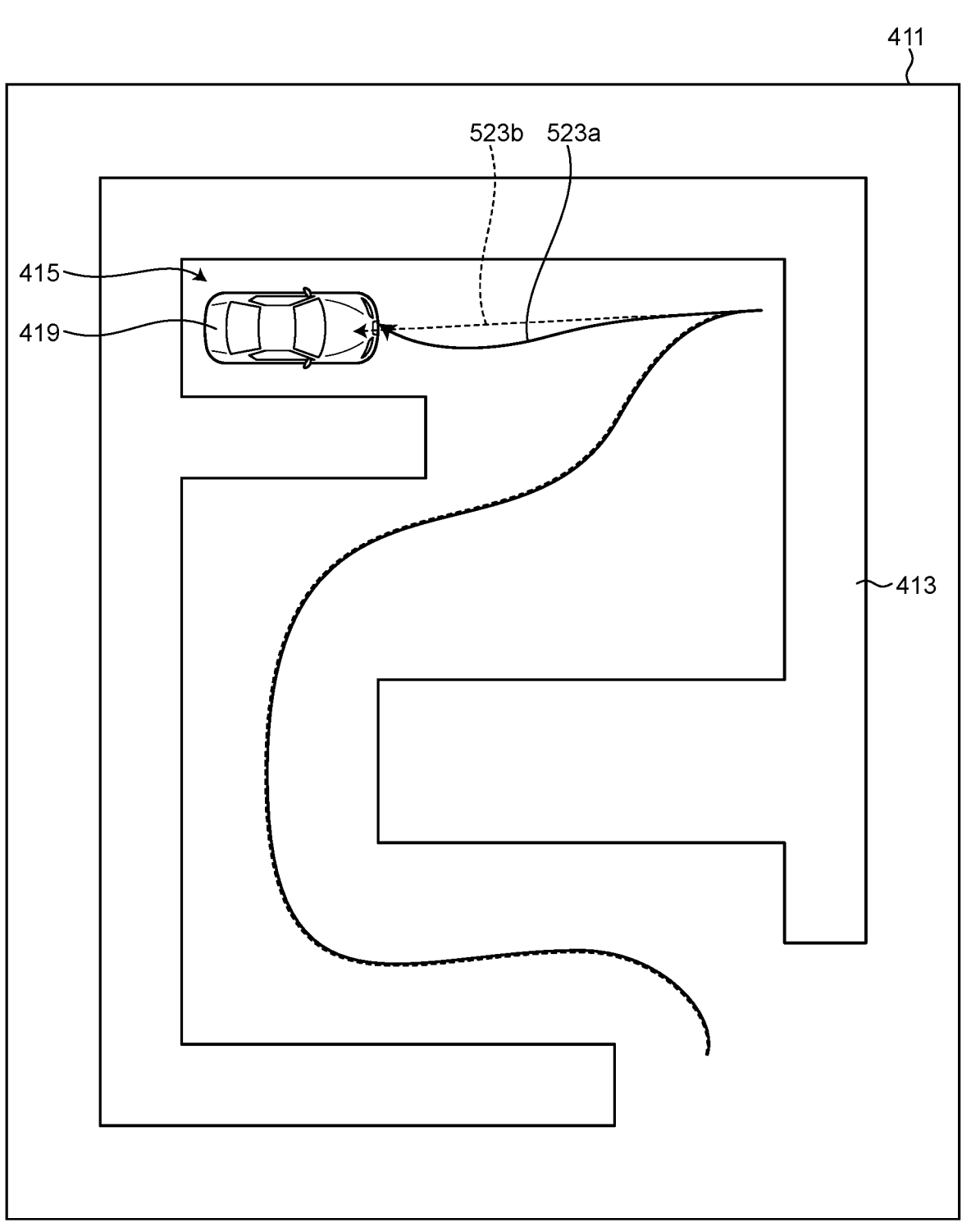
FIG. 8 is a diagram illustrating an example of a display screen displayed in the assistance process according to the embodiment.

Here, the presentation of the assistance information by the HMI 22 will be described again. FIG. 8 is a diagram illustrating an example of a display screen 411 displayed in the parking assistance process according to the embodiment. FIG. 8 exemplifies display of the assistance information regarding the corrected teacher path (corrected path) corresponding to the parking mode 601*b* designated by the user.

For example, the output control module 309 outputs, for example, display information for displaying the display screen 411 to the HMI 22 as information indicating the corrected path, which has been corrected based on the parking mode 601*b* designated by the user. As an example, the display screen 411 is displayed at completion of the generation of the corrected path corresponding to the designated parking mode 601*b*. As an example, the display screen 411 includes an overhead view image in which the corrected path (broken line in FIG. 8) is superimposed on the surrounding image of the vehicle 1. FIG. 8 exemplifies a wall 413 and a parking space 415 defined by a wall 413 as a surrounding image of the vehicle 1. The parking space 415 in FIG. 8 may correspond to the parking space 405 in FIG. 5. That is, the wall 403 in FIG. 5 may represent a part of the wall 413 in FIG. 8.

In addition, the display screen 411 includes a display 419 of the designated parking mode 601*b* together with the corrected path. The display 419 may be a surround view image indicating the designated parking mode 601*b*, or may be another display such as a frame display, similarly to the display 407 of FIG. 5.

As illustrated in FIG. 8, the display screen 411 may include a display of the teacher path before correction (solid line in FIG. 8) together with the corrected path. In addition, the display screen 411 may display a parking mode 401*a* before correction similarly to the display 407 of FIG. 5. Alternatively, the designation of the parking mode with respect to the display 419 may be received on the display screen 411, and for example, a display for designating the parking mode may be performed on the display 419 similarly to the display 409 of FIG. 5. That is, a screen similar to the display screen 411 can be used as a parking mode designation screen instead of FIG. 5. In other words, the display screen 401 of FIG. 5 may include display of the teacher path.

As an example, the display screen 411 may be a screen that displays only the corrected path (broken line in FIG. 8) which is a corrected teacher path. That is, the display of the surrounding image of the vehicle 1 including the wall 413 and the like is not essential on the display screen 411, and it is allowable to display, for example, an image in which the corrected path is superimposed on a black background. It is still allowable to display the teacher path before correction (solid line in FIG. 8) together with the corrected path even when not displaying the surrounding image of the vehicle 1.

In the reproduced traveling process performed after the path correction, a screen displaying the corrected path may be displayed similarly to the display screen 411 of FIG. 8.

Next, a flow of a parking assistance process executed by the parking assistance device 3 configured as described above will be described. As described above, the parking assistance process executed by the parking assistance device 3 includes a teacher traveling process, a path correction process, and a reproduced traveling process. Here, the path correction process executed after at least one teacher traveling will be described.

Figure 9:
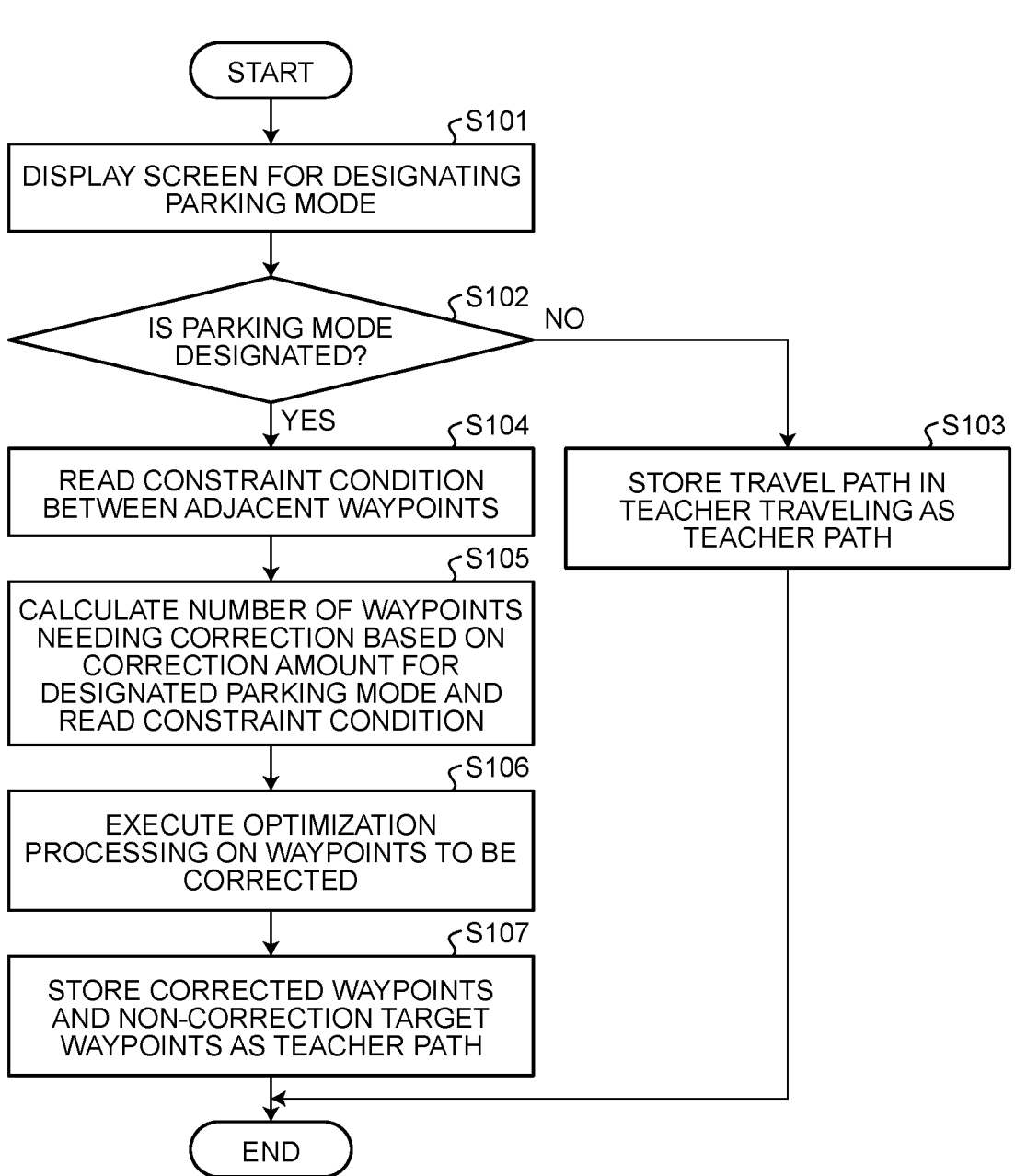
FIG. 9 is a flowchart illustrating an example of a flow of a path correction process executed by the parking assistance device according to the embodiment.

FIG. 9 is a flowchart illustrating an example of a flow of the path correction process executed by the parking assistance device 3 according to the embodiment. The flow of FIG. 9 exemplifies the path correction process executed as a series of flow with the teacher traveling process. That is, the flow of FIG. 9 is started in a state where the vehicle 1 is stopped at the parking end position in the teacher traveling process.

When the teacher traveling is finished, the output control module 309 displays a screen for designating a parking mode (S101). For example, as exemplified in FIG. 5, the output control module 309 generates display information for displaying a display screen 401 including a display 408 such as a surround view image at the end of teacher traveling and a display 409 for designating a parking mode, and then outputs the generated display information as assistance information.

Based on the output from the HMI 22 in response to the user's operation related to the display 409, for example, the parking mode modification module 308 determines whether the parking mode is designated (S102). Here, the "designation of the parking mode" is a result of a user's operation of changing at least one of the position and orientation in relation to the parking mode 601*b* indicated in a simulated manner by the display 409 on the display screen 401, changed from the parking mode 601*a* at the end of the teacher traveling.

When it is not determined that the parking mode is designated (S102: No), the parking mode modification module 308 stores a travel path in the teacher traveling, that is, a travel path for parking the vehicle 1 in the parking mode 601*a* at the end of the teacher traveling by the storage unit 305 as a teacher path (S103). Thereafter, the flow of FIG. 9 ends.

In contrast, when it is determined that the parking mode is designated (S102: Yes), the parking mode modification module 308 reads a constraint condition between adjacent waypoints from the storage unit 305 (S104).

The parking mode modification module 308 then calculates the number of waypoints needing correction based on the correction amount for the designated parking mode and the read constraint condition (S105).

In addition, the parking mode modification module 308 executes optimization processing for the waypoints 701 to be corrected (S106).

In addition, the parking mode modification module 308 stores the non-correction-target waypoints 703 and the correction-target waypoints 701 after correction by the storage unit 305 as a corrected teacher path (S107). Thereafter, the flow of FIG. 9 ends.

There is conventionally known parking assistance in which a user's travel path of the vehicle 1 is stored as a teacher path during teacher traveling, and a merging path to merge with the stored teacher path is generated during automated parking so as to allow the vehicle 1 to move to and park at a parking end position of the teacher traveling. In such path storage type automated parking, a local map and path information expressed by a coordinate system of the map are created and stored at the end of teacher traveling. Here, the parking position of the vehicle 1 in the teacher traveling is expressed by the waypoint of the end point of the path information.

In the path storage type automated parking, the parking mode as a result of performing the teacher traveling is not as desired by the user in some cases, for example, where the vehicle 1 is obliquely stopped, that is, stopped not along the line of the parking space. In a case where the parking mode at the time of the teacher traveling is not as desired by the user, the vehicle 1 is to be parked in such an undesired parking mode every time the automated parking is performed. On the other hand, redoing the teacher traveling until the vehicle can be stopped in the desired parking mode has been a burden on the user.

Under such circumstances, the parking assistance device 3 according to the embodiment has a configuration related to the automated correction function of the teacher traveling path, in which the user can designate the parking mode of the ideal parking position and parking orientation through the UI such as a surround view image, at the end of the teacher traveling, for example. An ideal position (defined by coordinates) on the local map is uniquely determined by designating an ideal parking mode after the teacher traveling.

In addition, following the designation of the parking mode, the parking assistance device 3 according to the embodiment generates a teacher path that finally reaches the designated parking mode by correcting the stored teacher path. This makes it possible to perform path correction based on the travel path reflecting the user's ideal traveling considering locations through which the user does not want to pass in the environment where the teacher traveling has been performed. The user can park the vehicle in an ideal parking mode in the next or subsequent reproduced traveling without redoing the teacher traveling. Therefore, with the parking assistance according to the embodiment, it is possible to improve the usability of the end user in automated parking.

The parking assistance device 3 according to the embodiment modifies the waypoints by going back by a necessary amount so that a final end point of the teacher traveling satisfies a predefined constraint condition so as to achieve a designated ideal parking mode. This makes it possible to suppress inclusion of an abrupt orientation change in the teacher path, leading to facilitation of follow-up of the vehicle 1 during automated parking. This suppresses unnecessary deceleration and the like, making it possible to reduce the user's uncomfortable feeling during automated parking.

In addition, with the configuration of adjusting the position of starting the correction according to the correction amount of the parking mode, it is possible to generate a corrected teacher path so as to achieve a travel path reflecting the user's ideal as much as possible, such as a considering a location through which the user does not want to pass in the environment where the teacher traveling has been performed.

The above-described embodiment is an exemplary case where the number of waypoints requiring correction is calculated based on the correction amount. However, the setting of the waypoints is not limited thereto. For example, a plurality of waypoints from the parking end position 515a to the first redirection position 513a starting from the parking end position 515a may be set as fixed waypoints 701 being correction targets. Furthermore, for example, a fixed number of waypoints may be used regardless of the correction amount. That is, waypoints of the fixed number from the waypoint Pa0 of the parking end position 515a to the waypoint Pa3 of the fixed number-th may be set as the waypoints 701 being correction targets.

In a case where the waypoint corresponding to the number-th of waypoints requiring correction calculated based on the correction amount goes beyond the redirection position 513a, the output control module 309 according to the above-described embodiment may generate notification information for notifying the user and may output the notification information to the HMI 22. That is, the parking assistance device 3 according to the above-described embodiment may notify the user in a case where correction cannot be performed within a range satisfying the constraint condition only with a backward driving path 523. This notification may notify an error or may prompt the user to redo the teacher traveling.

The above-described embodiment is an exemplary case where some of the plurality of waypoints defining the backward driving portion 523a of the teacher path, that is, waypoints from the parking position to the redirection position are set as the waypoints 701 being correction targets. However, waypoint setting is not limited thereto. That is, the above embodiment has described the case where the waypoint Pa3 is either the waypoint that defines the vehicle mode at the first redirection position 513a starting from the waypoint Pa0 among the plurality of waypoints defining the teacher path or the waypoint closer to the waypoint Pa0 than the defining waypoint. On the other hand, the parking mode modification module 308 according to the embodiment may set a plurality of waypoints including the waypoints defining the forward driving portion 521a as the waypoints 701 being correction targets. That is, the waypoints 701 being correction targets may include a waypoint farther than the first redirection position starting from the parking position.

The parking mode modification module 308 according to the above-described embodiment may perform path correction according to the designation of the vehicle mode of the redirection position 513b by the user, that is, designation of the redirection mode. In the path correction according to the designation of the redirection mode, the redirection positions 513a and 513b are handled similarly to the parking end positions 515a and 515b according to the above-described embodiment. For example, the reception module 302 may receive designation of the redirection mode, that is, an instruction to change the redirection mode based on the output of the HMI 22 in response to the user's operation. For example, the output control module 309 may output, to the HMI 22, display information for displaying a display screen for designating a redirection mode desired by the user, the display screen including a display indicating the redirection mode of the teacher path and a display simulating a desired redirection mode as an operation target. For example, the parking mode modification module 308 may modify the waypoint backward from the redirection position 513*b* in accordance with the correction amount with respect to the redirection mode designated by the user. The correction amount may be a difference between a waypoint (sixth waypoint) that defines a first vehicle mode related to the redirection position 513*a* and a waypoint (seventh waypoint) that defines a second vehicle mode related to the redirection position 513*b* designated by the user. In this case, the waypoint being correction targets may be a plurality of waypoints from a waypoint that defines the first vehicle mode related to the redirection position 513*a* to a waypoint (eighth waypoint) corresponding to the number-th of waypoints equal to or greater than the number of waypoints required for correction.

The above-described embodiment is an exemplary case where the parking mode 601*b* is designated by the user. However, designation is not limited thereto. The reception module 302 may receive designation of the parking mode 601*b* based on an output from an in-vehicle sensor such as the sonar 211 or the all-around camera 212. For example, the acquisition module 301 may acquire information regarding an object around the vehicle 1, such as a wall, an obstacle, or a white line defining a parking frame, as information related to the vehicle 1 stopped in the parking mode 601*a*. For example, the reception module 302 may receive, as an instruction to change the parking mode 601*b*, a parking mode fitting a parking space of the vehicle 1 defined by information regarding an object around the vehicle 1. As an example, the parking mode modification module 308 determines whether the longitudinal direction of the vehicle 1 is parallel to a side wall, an obstacle, or a white line of the vehicle 1 stopped in the parking mode 601*a* based on the information regarding the object around the vehicle 1 acquired by the acquisition module 301. When the parking mode modification module 308 determines not parallel, the reception module 302 may receive the parking mode 601*b* fitting the wall, the obstacle, or the white line as the instruction to change the parking mode. This configuration makes it possible to achieve parking in an appropriate parking mode according to the surrounding environment of the parking space. Incidentally, there may be a mode in which a parking mode fitting the parking space of the vehicle 1 is presented to the user on the display screen 401. For example, a parking mode fitting the parking space of the vehicle 1 may be used as an initial display of the display 409 on the display screen 401.

In the above embodiment, "determining whether it is A" may represent "determining that it is A", "determining that it is not A", or "determining whether it is A or not".

The program executed by the parking assistance device 3 of the above-described embodiment is provided in the form of being recorded in a computer-readable recording medium such as a CD-ROM, an FD, a CD-R, or a DVD as a file in an installable format or an executable format.

Furthermore, the programs executed on the parking assistance device 3 in the above-described embodiment may be stored on a computer connected to a network such as the Internet and be provided by downloading via the network. Furthermore, the programs executed on the parking assistance device 3 may be provided or distributed via a network such as the Internet.

In addition, the programs executed by the parking assistance device 3 of the above-described embodiment may be provided by being incorporated beforehand in a medium such as ROM.

In addition, the program executed by the parking assistance device 3 of the above-described embodiment has a module configuration including the above-described functional units (the acquisition module 301, the reception module 302, the map information generation module 303, the travel path detection module 304, the storage unit 305, the self-position estimation module 306, the path-following calculation module 307, the parking mode modification module 308, the output control module 309, and the vehicle control module 310). In actual hardware, the CPU 31 reads the program from the ROM 32 or the HDD 34 and executes the program, whereby the functional units are loaded onto the RAM 33 to generate the functional units on the RAM 33.

According to at least one embodiment described above, it is possible to appropriately assist parking of the vehicle 1 in an intended parking mode.

According to the present disclosure, it is possible to appropriately assist parking of a vehicle at an intended parking position.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

(Supplement)

The following technique is disclosed by the above description of the embodiments.

(1) A parking assistance method including:

storing information related to a teacher path, the teacher path being a travel path in teacher traveling of moving a vehicle and stopping the vehicle in a first parking mode;

receiving an instruction to change a parking mode, the instruction designating a second parking mode different from the first parking mode; and correcting the teacher path based on the second parking mode.

(2) The parking assistance method according to (1), in which each of the first parking mode and the second parking mode is at least one of a parking position and a parking orientation of the vehicle.

(3) The parking assistance method according to (1) or (2), further including outputting, to a display device, information indicating a corrected path corrected based on the second parking mode.

(4) The parking assistance method according to any one of (1) to (3), further including performing path correction including: modifying waypoints to be corrected from a first waypoint defining the first parking mode to a third waypoint among a plurality of waypoints defining the teacher path based on a correction amount of a parking mode, the correction amount being a difference between the first waypoint and a second waypoint defining the second parking mode; and defining the teacher path by a plurality of waypoints including the corrected waypoints from the second waypoint to the third waypoint.

(5) The parking assistance method according to (4), further including:

storing a constraint condition related to a change amount of a vehicle mode of the vehicle between predetermined adjacent waypoints; and calculating a number of waypoints required to correct the correction amount within a range satisfying the constraint condition, and specifying a waypoint corresponding to a number-th of waypoints equal to or greater than the calculated number of waypoints as the third waypoint, starting from the first waypoint among the plurality of waypoints defining the teacher path.

(6) The parking assistance method according to (4), in which the third waypoint is a waypoint corresponding to a predetermined number-th of waypoints starting from the first waypoint among the plurality of waypoints defining the teacher path.

(7) The parking assistance method according to (5) or (6), in which the third waypoint is either a waypoint defining the vehicle mode of the vehicle in first redirection starting from the first waypoint among the plurality of waypoints defining the teacher path, or a waypoint closer to the first waypoint than the waypoint defining the vehicle mode.

(8) The parking assistance method according to any one of (5) to (7), further including outputting notification information for notifying a user when the waypoint corresponding to the number-th of waypoints equal to or greater than the number of waypoints starting from the first waypoint among the plurality of waypoints defining the teacher path goes beyond the waypoint defining the vehicle mode in the first redirection starting from the first waypoint among the plurality of waypoints defining the teacher path.

(9) The parking assistance method according to any one of (1) to (8), in which the instruction to change the parking mode is based on a user's operation of designating the second parking mode.

(10) The parking assistance method according to claim 9, further including outputting display information for displaying a display screen on a display device, the display screen including a display indicating the first parking mode and a display simulating the second parking mode.

(11) The parking assistance method according to any one of (1) to (10), in which the instruction to change the parking mode is based on information related to an object around the vehicle stopped in the first parking mode, the information being transmitted from an in-vehicle sensor mounted on the vehicle.

(12) The parking assistance method according to any one of (4) to (11), further including:

receiving an instruction to change the parking mode designating a third parking mode different from the second parking mode; and performing path correction including: modifying waypoints to be corrected from the second waypoint to a fifth waypoint among the plurality of waypoints defining the teacher path based on a correction amount of at least one of position and orientation of the vehicle, the correction amount being a difference between the second waypoint and a fourth waypoint defining the third parking mode; and defining the teacher path by a plurality of waypoints including the corrected waypoints from the fourth waypoint to the fifth waypoint.

(13) The parking assistance method according to any one of (4) to (12), further including:

receiving an instruction to change a redirection mode designating a vehicle mode of the vehicle in first redirection starting from the first waypoint among the plurality of waypoints defining the teacher path; and modifying waypoints to be corrected from a sixth waypoint defining a first vehicle mode in the first redirection to an eighth waypoint among the plurality of waypoints defining the teacher path based on a correction amount of the vehicle mode in the first redirection, the correction amount being a difference between the sixth waypoint and a seventh waypoint defining a designated second vehicle mode on the teacher path, and defining the teacher path by a plurality of waypoints including the corrected waypoints from the seventh waypoint to the eighth waypoint.

(14) The parking assistance method according to any one of (1) to (13), further including controlling reproduced traveling of moving the vehicle along the teacher path and stopping the vehicle in the second parking mode based on the information related to the teacher path.

(15) A parking assistance device comprising:

a memory configured to store information related to a teacher path, the teacher path being a travel path in teacher traveling of moving a vehicle and stopping the vehicle in a first parking mode; and a processor coupled to the memory and configured to:

receive an instruction to change a parking mode, the instruction designating a second parking mode different from the first parking mode; and correct the teacher path based on the second parking mode.

(16) The parking assistance device according to (15), in which each of the first parking mode and the second parking mode is at least one of a parking position and a parking orientation of the vehicle.

(17) The parking assistance device according to (15) or (16), further including an output control module configured to output information indicating the corrected path corrected based on the second parking mode to a display device.

(18) The parking assistance device according to any one of (15) to (17), in which the correction module performs path correction including:

modifying waypoints to be corrected from a first waypoint defining the first parking mode to a third waypoint among a plurality of waypoints defining the teacher path based on a correction amount of a parking mode, the correction amount being a difference between the first waypoint and the second waypoint defining the second parking mode; and defining the teacher path by a plurality of waypoints including corrected waypoints from the second waypoint to the third waypoint.

(19) The parking assistance device according to (18), in which the storage unit stores a constraint condition related to a change amount of a vehicle mode of the vehicle between predetermined adjacent waypoints, and the correction module calculates the number of waypoints required to correct the correction amount within a range satisfying the constraint condition, and specifies a waypoint corresponding to the number-th of waypoints equal to or greater than the calculated number of waypoints as the third waypoint, starting from the first waypoint among the plurality of waypoints defining the teacher path.

(20) The parking assistance device according to (18), in which the third waypoint is a waypoint corresponding to a predetermined number-th of waypoints, starting from the first waypoint among the plurality of waypoints defining the teacher path.

(21) The parking assistance device according to (19) or (20), in which the third waypoint is either a waypoint defining the vehicle mode of the vehicle in first redirection starting from the first waypoint among the plurality of waypoints defining the model path, or a waypoint closer to the first waypoint than the waypoint defining the vehicle mode.

(22) The parking assistance device according to any one of (19) to (21), further including a display control module, the display control module being configured to output notification information for notifying a user in a case where the waypoint corresponding to the number-th of waypoints equal to or greater than the number of waypoints starting from the first waypoint among the plurality of waypoints defining the teacher path goes beyond the waypoint defining the vehicle mode in the first redirection starting from the first waypoint among the plurality of waypoints defining the teacher path.

(23) The parking assistance device according to any one of (15) to (22), in which the instruction to change the parking mode is based on a user's operation of designating the second parking mode.

(24) The parking assistance device according to (23), further including a display control module, the display control module being configured to output display information for displaying a display screen on a display device, the display screen including a display indicating the first parking mode and a display simulating the second parking mode.

(25) The parking assistance device according to any one of (15) to (24), in which the instruction to change the parking mode is based on information related to an object around the vehicle stopped in the first parking mode, the information being transmitted from an in-vehicle sensor mounted on the vehicle.

(26) The parking assistance device according to any one of (18) to (25), among which (18) is directly or indirectly cited, in which the reception module receives an instruction to change the parking mode to a mode designating a third parking mode different from the second parking mode, and the correction module performs path correction including:
modifying waypoints to be corrected from the second waypoint to a fifth waypoint among the plurality of waypoints defining the teacher path based on a correction amount of at least one of position and orientation of the vehicle, the correction amount being a difference between the second waypoint and a fourth waypoint defining the third parking mode; and defining the teacher path by a plurality of waypoints including corrected waypoints from the fourth waypoint to the fifth waypoint.

(27) The parking assistance device according to any one of (18) to (26), among which (18) is directly or indirectly cited, in which the reception module receives an instruction to change a redirection mode designating a vehicle mode of the vehicle in first redirection starting from the first waypoint among the plurality of waypoints defining the teacher path, and the correction module modifies waypoints to be corrected from a sixth waypoint defining a first vehicle mode in the first redirection on the teacher path to an eighth waypoint among the plurality of waypoints defining the teacher path based on a correction amount of the vehicle mode in the first redirection, the correction amount being a difference between the sixth waypoint and a seventh waypoint defining a designated second vehicle mode, and defines the teacher path by a plurality of waypoints including the corrected waypoints from the seventh waypoint to the eighth waypoint.

(28) The parking assistance device according to any one of (15) to (27), further including a vehicle control module configured to control reproduced traveling of moving the vehicle along the teacher path and stopping the vehicle in the second parking mode based on the information related to the teacher path.

(29) A program for causing a computer to execute the parking assistance method according to any one of (1) to (14).

(30) A recording medium (Computer Program Product) recording a program to be executed by a computer, the program being the program according to (29).

(31) A vehicle including:
the parking assistance device according to any one of (15) to (28); and
an operation unit configured to receive a user's operation related to designation of a parking mode and/or designation of a vehicle mode in redirection.

(32) A vehicle including:
the parking assistance device according to any one of (15) to (28); and
a display device configured to display a display screen for receiving a user's operation.

(33) A vehicle including:
the parking assistance device according to (28); and
a control device configured to control at least one of a steering angle, driving, and braking, based on a control signal from the vehicle control module.

(34) A vehicle including:
the parking assistance device according to any one of (15) to (28); and
at least one of a sonar, an all-around camera, a steering angle sensor, a wheel speed sensor, an azimuth sensor, and a GNSS sensor.

What is claimed is:

1. A parking assistance method for automatically driving a vehicle, the parking assistance method comprising:
generating an overhead view image by combining a front image of the vehicle, a rear image of the vehicle, and a side image of the vehicle;
storing first feature point information in teacher traveling of moving the vehicle and stopping the vehicle in a first parking mode;
comparing the stored first feature point information with second feature point information extracted from a current surrounding image of the vehicle;
displaying the overhead view image, information indicating the first parking mode, and information simulating a second parking mode different from the first parking mode;
receiving an instruction to change a current parking mode, the instruction designating the second parking mode different from the first parking mode; and automatically driving the vehicle based on the second parking mode, wherein the second parking mode includes a second parking position and a second parking orientation of the vehicle, the information simulating the second parking mode is displayed after the teacher traveling, the instruction to change the current parking mode is based on a user operation of designating the second parking mode, the user operation is performed by moving and rotating the information simulating the second parking mode, a first parking position and a first parking orientation of the vehicle in the first parking mode are different from the second parking position and the second parking orientation of the vehicle in the second parking mode, and a driving route of the teacher traveling and a driving route of an automated traveling based on the second parking mode are different.

2. The parking assistance method according to claim 1, wherein the first parking mode and the second parking mode include parking positions and parking orientations of the vehicle.

3. The parking assistance method according to claim 1, further comprising:

outputting, to a display device, information indicating a corrected path corrected based on the second parking mode.

4. The parking assistance method according to claim 1, further comprising:

performing path correction including: modifying waypoints to be corrected from a first waypoint defining the first parking mode to a third waypoint among a plurality of waypoints defining the teacher path based on a correction amount of a parking mode, the correction amount being a difference between the first waypoint and a second waypoint defining the second parking mode; and defining the teacher path by a plurality of waypoints including the corrected waypoints from the second waypoint to the third waypoint.

5. The parking assistance method according to claim 4, further comprising:

storing a constraint condition related to a change amount of a vehicle mode of the vehicle between predetermined adjacent waypoints; and calculating a number of waypoints required to correct the correction amount within a range satisfying the constraint condition, and specifying a waypoint corresponding to a number-th of waypoints equal to or greater than the calculated number of waypoints as the third waypoint, starting from the first waypoint among the plurality of waypoints defining the teacher path.

6. The parking assistance method according to claim 4, wherein the third waypoint is a waypoint corresponding to a predetermined number-th of waypoints starting from the first waypoint among the plurality of waypoints defining the teacher path.

7. The parking assistance method according to claim 5, wherein the third waypoint is either a waypoint defining the vehicle mode of the vehicle in first redirection starting from the first waypoint among the plurality of waypoints defining the teacher path, or a waypoint closer to the first waypoint than the waypoint defining the vehicle mode.

8. The parking assistance method according to claim 6, wherein the third waypoint is either a waypoint defining the vehicle mode of the vehicle in first redirection starting from the first waypoint among the plurality of waypoints defining the teacher path, or a waypoint closer to the first waypoint than the waypoint defining the vehicle mode.

9. The parking assistance method according to claim 5, further comprising:

outputting notification information for notifying a user when the waypoint corresponding to the number-th of waypoints equal to or greater than the number of waypoints starting from the first waypoint among the plurality of waypoints defining the teacher path goes beyond the waypoint defining the vehicle mode in the first redirection starting from the first waypoint among the plurality of waypoints defining the teacher path.

10. The parking assistance method according to claim 1, further comprising:

outputting display information for displaying a display screen on a display device, the display screen including the information indicating the first parking mode and the information simulating the second parking mode.

11. The parking assistance method according to claim 1, wherein the instruction to change the current parking mode is further configured to be based on information related to an object around the vehicle stopped in the first parking mode, the information being transmitted from an in-vehicle sensor mounted on the vehicle.

12. The parking assistance method according to claim 4, further comprising:

receiving an instruction to change the parking mode designating a third parking mode different from the second parking mode; and performing path correction including: modifying waypoints to be corrected from the second waypoint to a fifth waypoint among the plurality of waypoints defining the teacher path based on a correction amount of at least one of position and orientation of the vehicle, the correction amount being a difference between the second waypoint and a fourth waypoint defining the third parking mode; and defining the teacher path by a plurality of waypoints including the corrected waypoints from the fourth waypoint to the fifth waypoint.

13. The parking assistance method according to claim 4, further comprising:

receiving an instruction to change a redirection mode designating a vehicle mode of the vehicle in first redirection starting from the first waypoint among the plurality of waypoints defining the teacher path; and modifying waypoints to be corrected from a sixth waypoint defining a first vehicle mode in the first redirection to an eighth waypoint among the plurality of waypoints defining the teacher path based on a correction amount of the vehicle mode in the first redirection, the correction amount being a difference between the sixth waypoint and a seventh waypoint defining a designated second vehicle mode on the teacher path, and defining the teacher path by a plurality of waypoints including the corrected waypoints from the seventh waypoint to the eighth waypoint.

14. A parking assistance device for automatically driving a vehicle, the parking assistance device comprising:

a memory configured to store first feature point information in teacher traveling of moving a vehicle and stopping the vehicle in a first parking mode; and a processor coupled to the memory and configured to:

generate an overhead view image by combining a front image of the vehicle, a rear image of the vehicle, and a side image of the vehicle;

compare the stored first feature point information with second feature point information extracted from a current surrounding image of the vehicle;

display the overhead view image, information indicating the first parking mode, and information simulating a second parking mode different from the first parking mode;

receive an instruction to change a current parking mode, the instruction designating the second parking mode different from the first parking mode; and automatically drive the vehicle based on the second parking mode, wherein the second parking mode includes a second parking position and a second parking orientation of the vehicle, the information simulating the second parking mode is displayed after the teacher traveling, the instruction to change the current parking mode is based on a user operation of designating the second parking mode, the user operation is performed by moving and rotating the information simulating the second parking mode, a first parking position and a first parking orientation of the vehicle in the first parking mode are different from the second parking position and the second parking orientation of the vehicle in the second parking mode, and a driving route of the teacher traveling and a driving route of an automated traveling based on the second parking mode are different.

15. The parking assistance device according to claim 14, wherein the first parking mode and the second parking mode include a parking positions and parking orientations of the vehicle.

16. The parking assistance device according to claim 14, wherein the processor is configured to output, to a display device, information indicating a corrected path corrected based on the second parking mode.

17. The parking assistance device according to claim 14, wherein the processor is configured to perform path correction including: modifying waypoints to be corrected from a first waypoint defining the first parking mode to a third waypoint among a plurality of waypoints defining the teacher path based on a correction amount of a parking mode, the correction amount being a difference between the first waypoint and a second waypoint defining the second parking mode; and defining the teacher path by a plurality of waypoints including the corrected waypoints from the second waypoint to the third waypoint.

18. The parking assistance device according to claim 17, wherein the memory is configured to store a constraint condition related to a change amount of a vehicle mode of the vehicle between predetermined adjacent waypoints, and the processor is configured to calculate a number of waypoints required to correct the correction amount within a range satisfying the constraint condition, and specify a waypoint corresponding to a number-th of waypoints equal to or greater than the calculated number of waypoints as the third waypoint, starting from the first waypoint among the plurality of waypoints defining the teacher path.

19. The parking assistance device according to claim 17, wherein the third waypoint is a waypoint corresponding to a predetermined number-th of waypoints starting from the first waypoint among the plurality of waypoints defining the teacher path.

* * * * *